UNITED STATES PATENT OFFICE.

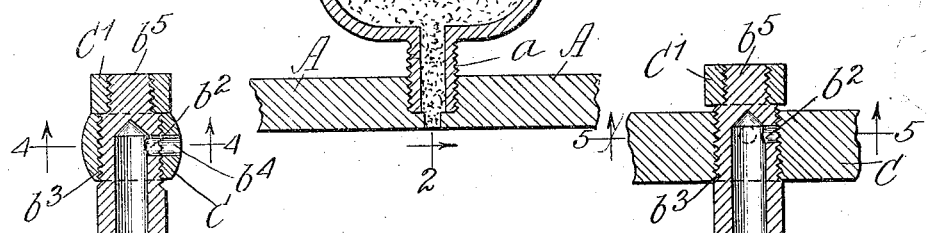
No. 839,539. PATENTED DEC. 25, 1906.
F. BEEBE.
GREASE CUP.
APPLICATION FILED NOV. 9, 1905.

FRED BEEBE, OF LUDINGTON, MICHIGAN.

GREASE-CUP.

No. 839,539.

Specification of Letters Patent.

Patented Dec. 25, 1906.

Application filed November 9, 1905. Serial No. 286,518.

*To all whom it may concern:*

Be it known that I, FRED BEEBE, a citizen of the United States, and a resident of Ludington, in the county of Mason and State of Michigan, have invented certain new and useful Improvements in Grease-Cups; and I do hereby declare that the following is a full, clear, and exact description of the same, reference being had to the accompanying drawings, and to the letters of reference marked thereon, which form a part of this specification.

This invention relates to improvements in grease-cups, and more particularly to a grease-cup of that class provided with means for forcing the grease into the bearings.

Heretofore in the use of thick or non-liquid grease as lubricant it has been customary to employ in the grease-cup some means—usually an internal cap or closure threaded within the cup—to force the grease into the bearings. When, however, the cap or closure is retracted for inspection or refilling, the outward movement of said cap or closure tends to create a vacuum in the cup, thereby drawing the grease from the bearing and from the duct leading from the cup to the bearing, with the result that when the cup is refilled and the closure again inserted air is caught beneath the grease and forced into the bearing, thereby preventing the grease again entering until the air escapes, ofttimes causing the bearing to run hot.

The object of this invention is to provide a grease-cup from which the grease may be forced into the journal and which is adapted to prevent the grease from being retracted or withdrawn from the bearing when the closure is removed from the cup.

The invention consists in the matters hereinafter described, and more fully pointed out and defined in the appended claims.

In the drawings, Figure 1 is a vertical central section of a grease-cup embodying my invention, showing parts in elevation. Fig. 2 is an enlarged section taken on line 2 2 of Fig. 1 with parts removed. Fig. 3 is a similar view, but showing a different adjustment of the parts. Fig. 4 is a section taken on line 4 4 of Fig. 2. Fig. 5 is a section taken on line 5 5 of Fig. 3.

As shown in the drawings, A represents the top of a journal-bearing, which is tapped to receive the screw-threaded tubular stem $a$ of the grease-cup $A'$, affording a duct to the bearing, as is usual in such devices. Said cup $A'$, as shown, is screw-threaded internally for the greater portion of its depth, and having threaded engagement therein is the externally-threaded plunger or closure B. Extending upwardly from said plunger and, as shown, integral therewith is a rod or shaft $b$, provided with a longitudinal axial bore $b'$, opening at its lower end through the plunger into the cup and opening laterally adjacent its upper end through the aperture $b^2$ in the side of said rod $b$. Said rod $b$, as shown, is provided adjacent the upper end of the bore $b'$ with screw-threads $b^3$, adapted to receive thereon the centrally-apertured handle or lever C, by means of which the plunger is operated. Said handle is provided with a laterally-opening aperture $b^4$, adapted when the handle is at the upper limit of its adjustment on the rod to register with the aperture $b^2$, as shown more clearly in Figs. 2 and 4, thereby affording atmospheric communication with the interior of the cup, and when said handle is at the lower limit of its adjustment to be out of register therewith, as shown in Figs. 3 and 5. The upper end $b^5$ of said rod $b$ is reduced in size and screw-threaded and is provided with a set-nut $C'$, adapted to be adjusted to permit said handle to have but a quarter-turn on the rod, and when it has reached the limit of its movement in either direction with respect to the rod the handle acts to rotate the plunger, moving it into or out of the cup, according to the direction of rotation.

The operation is as follows: The cup having been filled with grease D, the plunger is inserted, and the pressure exerted on the handle or lever C in screwing down the plunger rotates said handle sufficiently to close the aperture leading to the bore $b'$, thereby preventing the escape of air from the cup. Said plunger may be adjusted in the cup to give any desired pressure on the grease to force it into the journal. When, however, it is desired to remove the plunger from the cup, the handle is permitted by the nut $C'$ to have a partial revolution on the rod $b$, which brings it into position for the aperture $b^4$ to register with the aperture $b^2$, thereby permitting the air to enter the cup. Inasmuch as air can readily enter the cup from above the grease when the plunger is being retracted, there is no tendency to draw the grease from the bearing and cause an air-cushion beneath the same when the plunger is again inserted.

Obviously the cup may be constructed of any suitable material and in any preferred form and size.

I claim as my invention—

1. The combination with a cup of a rotatable plunger adjustably engaged therein and affording a closure for the cup, a tubular shaft on said plunger and means on the outer end of said shaft acting when the plunger is rotated to open or close the passage in said shaft dependent upon the direction of rotation.

2. In a device of the class described the combination with a cup of a closure having threaded engagement therein, an outwardly-directed shaft on said closure provided with a bore opening at its inner end into the cup and at its outer end through the side of the shaft and a handle rotatably engaged on the outer end of said shaft adapted to control the outer end of said bore.

3. In a device of the class described the combination with a cup of a plunger therein, a shaft on said plunger having a longitudinal bore opening at one end through the plunger and at the other through the side of the shaft and a handle rotatably engaged at the end of said shaft and provided with an aperture therein adapted when the plunger is being retracted to register with said bore.

4. In a device of the class described the combination with a cup, of a rotative closure therefor, and provided with an air-passage therethrough and means for rotating said closure and adapted when the closure is retracted to open the passage and when the closure is inserted to close the passage.

5. In a device of the class described the combination with a cup, of a rotative plunger therein affording a closure for the cup, a tubular shaft on said plunger affording an air-passage from the interior of the cup to the atmosphere and a rotative apertured handle on said shaft adapted when the plunger is being inserted to close said air-passage and when being retracted to open said passage.

6. In a device of the class described the combination with a cup adapted for engagement on a journal-bearing, of a plunger having threaded engagement therein, a rod extending outwardly from said plunger and provided with a longitudinal bore opening at one end into the cup and at the other through the side of the rod, a handle rotatively engaged on the outer end of said rod and provided with an aperture through the side thereof adapted at one adjustment of the handle to communicate with said bore and means adapted to limit the movement of said handle with respect to said rod.

In testimony whereof I have hereunto subscribed my name in the presence of two subscribing witnesses.

FRED BEEBE.

Witnesses:
 THOMAS FORD,
 JOHN PHELAN.